United States Patent
Jones et al.

(10) Patent No.: US 12,025,997 B2
(45) Date of Patent: Jul. 2, 2024

(54) REGULATOR STABILITY IN A PRESSURE REGULATED STORAGE VESSEL

(71) Applicant: ENTEGRIS, Inc., Billerica, MA (US)

(72) Inventors: Edward Edmiston Jones, Woodbury, CT (US); Paul Eidsmore, Santa Cruz, CA (US)

(73) Assignee: ENTEGRIS, INC., Billerica, MA (US)

( * ) Notice: Subject to any disclaimer, the term of this patent is extended or adjusted under 35 U.S.C. 154(b) by 299 days.

(21) Appl. No.: 16/375,176

(22) Filed: Apr. 4, 2019

(65) Prior Publication Data

US 2019/0339726 A1 Nov. 7, 2019

Related U.S. Application Data

(60) Provisional application No. 62/666,755, filed on May 4, 2018.

(51) Int. Cl.
| | | |
|---|---|---|
| *G05D 16/06* | (2006.01) | |
| *F16K 17/24* | (2006.01) | |
| *F16K 31/126* | (2006.01) | |

(52) U.S. Cl.
CPC ......... *G05D 16/0619* (2013.01); *F16K 17/24* (2013.01); *F16K 31/126* (2013.01); *F17C 2205/0335* (2013.01); *F17C 2205/0338* (2013.01); *F17C 2205/0391* (2013.01); *Y10T 137/7823* (2015.04)

(58) Field of Classification Search
CPC .................... Y10T 137/7823; Y10T 137/7819
See application file for complete search history.

(56) References Cited

U.S. PATENT DOCUMENTS

| | | | | |
|---|---|---|---|---|
| 518,199 | A | * 4/1894 | Sarvent | .................. B60T 15/54 |
| | | | | 303/69 |
| 2,660,834 | A | * 12/1953 | Macglashan, Jr. | ..... G05D 16/10 |
| | | | | 137/505.39 |
| 3,762,436 | A | * 10/1973 | Clayton | ............. G05D 16/0663 |
| | | | | 137/505.35 |
| 4,004,715 | A | * 1/1977 | Williams | ............. B67D 1/1234 |
| | | | | 222/30 |
| 4,077,422 | A | 3/1978 | Brinkley | |
| 4,303,734 | A | 12/1981 | Sullivan | |
| 4,324,269 | A | * 4/1982 | Baranowski, Jr. | .......................... |
| | | | | G05D 16/0663 |
| | | | | 137/315.05 |

(Continued)

FOREIGN PATENT DOCUMENTS

| | | |
|---|---|---|
| CN | 1384315 A | 12/2002 |
| CN | 101476670 A | 7/2009 |

(Continued)

OTHER PUBLICATIONS

Solid State Technology, "Eliminating the eddects of gas-system pressure transients"; Feb. 2021, pp. 1-4.

*Primary Examiner* — Robert K Arundale

(57) ABSTRACT

A pressure regulator device for use within a pressure-regulated fluid storage and dispensing vessel primarily in low flow, low delivery pressure applications. Regulator stiction challenges have been solved with an improved poppet assembly using different poppet element configurations as well as an improved bellows structure in the pressure-sensing assembly that provides more flexibility during contraction and expansion of the diaphragm elements.

14 Claims, 4 Drawing Sheets

(56) References Cited

U.S. PATENT DOCUMENTS

| | | | |
|---|---|---|---|
| 4,712,619 A | 12/1987 | Stepp et al. | |
| 5,002,089 A * | 3/1991 | Reedy | F25B 41/06 |
| | | | 137/493.8 |
| 5,033,505 A * | 7/1991 | Eidsmore | F16K 17/24 |
| | | | 137/505.39 |
| 5,211,205 A * | 5/1993 | Grant | F02M 69/54 |
| | | | 123/457 |
| 5,303,734 A | 4/1994 | Eidsmore | |
| 5,520,214 A | 5/1996 | Mack et al. | |
| 5,694,975 A | 12/1997 | Eidsmore | |
| 5,937,895 A | 8/1999 | Le Febre | |
| 6,007,609 A | 12/1999 | Semerdjian | |
| 6,045,115 A | 4/2000 | Martin, Jr. | |
| 6,047,728 A * | 4/2000 | Eidsmore | G05D 16/0616 |
| | | | 137/505.42 |
| 6,089,027 A | 7/2000 | Wang | |
| 6,101,816 A | 8/2000 | Wang | |
| 6,343,476 B1 | 2/2002 | Wang | |
| 6,360,546 B1 | 3/2002 | Wang | |
| 6,390,134 B1 | 5/2002 | Hanby | |
| 6,907,740 B2 | 6/2005 | Tom | |
| 6,910,602 B2 | 6/2005 | Hasaka | |
| 6,959,724 B2 | 11/2005 | Heiderman | |
| 7,708,028 B2 | 5/2010 | Brown | |
| 7,905,247 B2 | 3/2011 | Campeau | |
| 9,897,257 B2 | 2/2018 | Despres | |
| 2002/0014227 A1 | 2/2002 | Girouard | |
| 2002/0050142 A1 | 5/2002 | Wang | |
| 2002/0134794 A1 * | 9/2002 | McManus | G01L 19/083 |
| | | | 222/55 |
| 2003/0213521 A1 | 11/2003 | Downie | |
| 2004/0089151 A1 | 5/2004 | Wang et al. | |
| 2004/0099313 A1 * | 5/2004 | Gotthelf | G05D 16/107 |
| | | | 137/505.39 |
| 2006/0065303 A1 | 3/2006 | Atkins, Sr. | |
| 2009/0166359 A1 | 7/2009 | Pisot | |
| 2011/0155267 A1 | 6/2011 | Nicolini et al. | |
| 2015/0247605 A1 * | 9/2015 | Despres | F17C 13/04 |
| | | | 222/1 |
| 2016/0258537 A1 | 9/2016 | Heiderman | |
| 2017/0248275 A1 | 8/2017 | Despres et al. | |
| 2018/0180225 A1 | 6/2018 | Despres | |
| 2020/0096113 A1 * | 3/2020 | Aoki | F16J 15/363 |

FOREIGN PATENT DOCUMENTS

| | | |
|---|---|---|
| CN | 101228390 B | 4/2010 |
| CN | 202274285 U | 6/2012 |
| CN | 105627083 A | 6/2016 |
| EP | 2428286 A2 | 3/2012 |
| JP | 5937211 | 9/1984 |
| JP | 0486362 | 3/1992 |
| JP | 061780 | 1/1994 |
| JP | 10174920 A | 6/1998 |
| JP | 0590100 | 1/2001 |
| JP | 2004046897 A | 2/2004 |
| JP | 2004150567 A | 5/2004 |
| JP | 2010281459 A | 12/2010 |
| JP | 2011524964 A | 9/2011 |
| JP | 2012210631 A | 11/2012 |
| TW | 200422554 A | 11/2004 |
| TW | 200900128 A | 1/2009 |
| WO | 0212779 W | 2/2002 |
| WO | 2004000338 A1 | 12/2003 |
| WO | 2004003426 A1 | 1/2004 |
| WO | 2007013715 W | 2/2007 |
| WO | 2009079218 A3 | 11/2009 |
| WO | 2010124722 A1 | 11/2010 |
| WO | 2008101257 W | 7/2011 |
| WO | 2014047522 W | 3/2014 |

\* cited by examiner

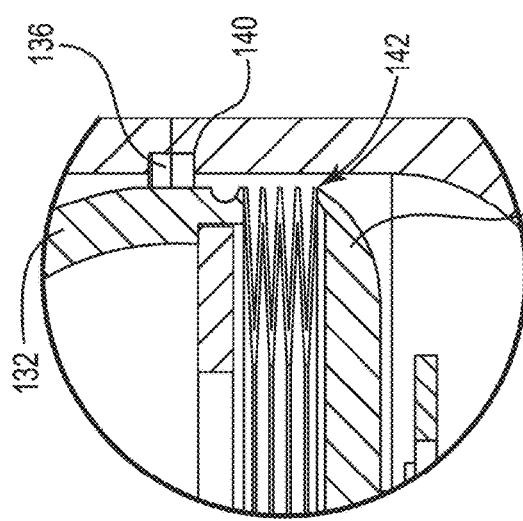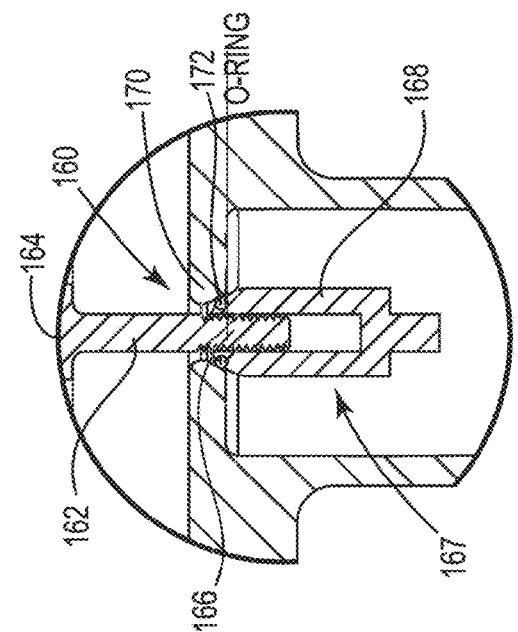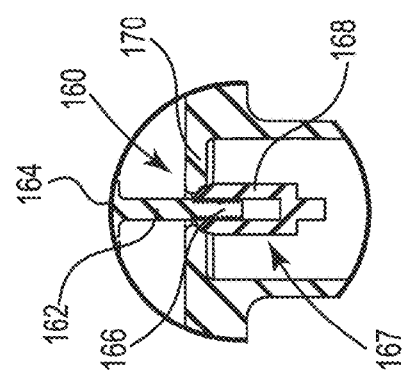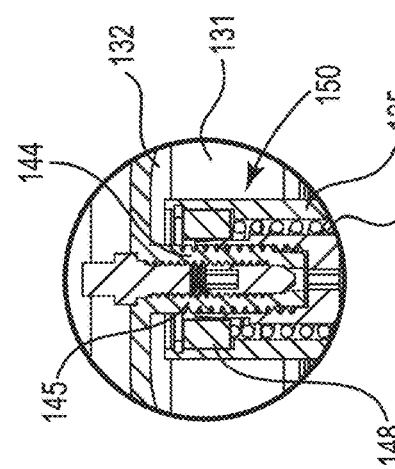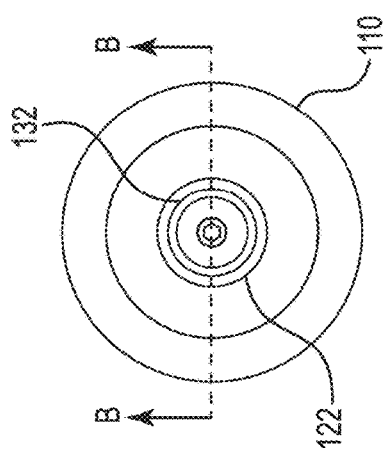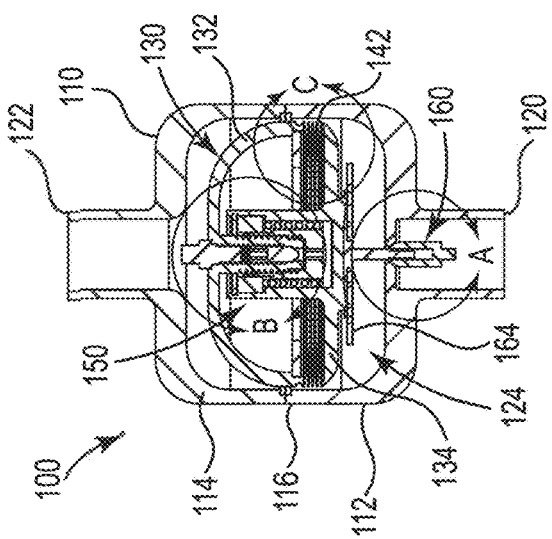

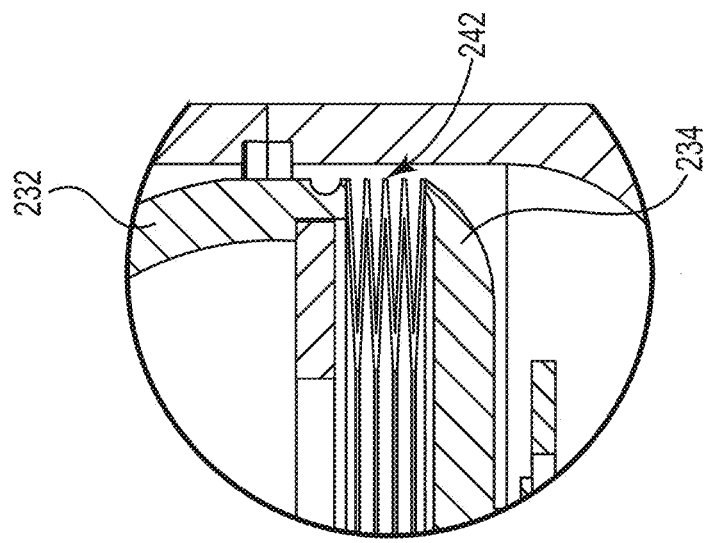
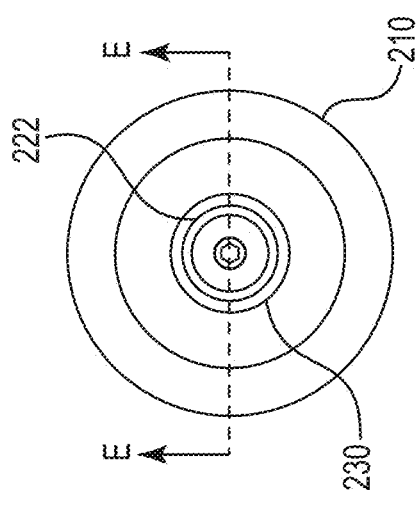
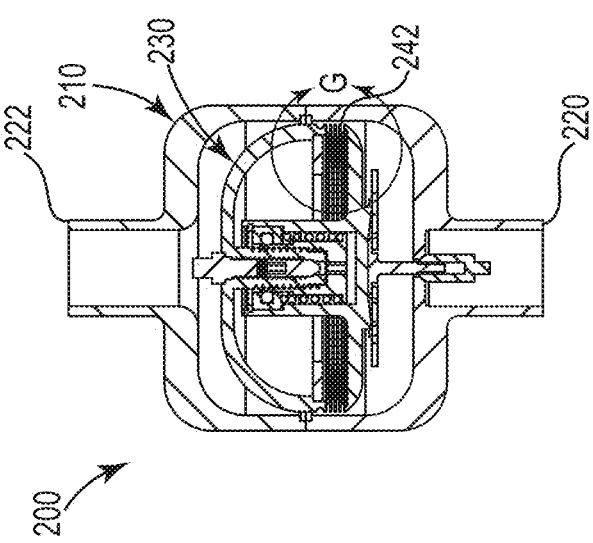

REGULATOR STABILITY IN A PRESSURE REGULATED STORAGE VESSEL

CROSS-REFERENCE TO RELATED APPLICATIONS

The present application claims the benefit under 35 USC 119 of U.S. Provisional Application No. 62/666,755 filed on May 4, 2018, the disclosure of which is hereby incorporated by reference herein in its entirety for all purposes. Additionally, the present application is related to U.S. Patent Publication No. 2015/0247605 (Ser. No. 14/430,105) filed on Mar. 20, 2015 which is hereby also incorporated herein by reference in its entirety.

TECHNICAL FIELD

The present disclosure relates to pressure management of pressure-regulated fluid storage and dispensing vessels that can be susceptible to severe pressure-fluctuations behavior upon initiation of fluid dispensing operation. The pressure management arrangements and methods of the present disclosure are also contemplated for use in resolving continual periodic pressure oscillations, also known as "spiking" behavior, e.g., fluid pressure excursions of a recurrent episodic character.

BACKGROUND

In the field of semiconductor manufacturing, various fluid supply packages are used to provide process fluids for use in the manufacturing operation and in ancillary fluid-utilizing processes such as process vessel cleaning. As a result of safety and process efficiency considerations, fluid supply packages have been developed that utilize fluid storage and dispensing vessels in which pressure-regulating devices are provided in the interior volume of the vessel or the vessel valve head. Examples of such fluid supply packages incorporating pressure-regulated vessels include the fluid supply packages commercially available from Entegris/ATMI, Inc. (Danbury, Conn., USA) under the trademark VAC®, the pressure-regulated vessel fluid supply packages commercially available from Praxair, Inc. under the trademark UPTIME.

In some instances, pressure-regulated vessels coupled to flow circuitry exhibit sudden pressure fluctuations upon initiation of fluid dispensing operation. This anomalous behavior is most frequently experienced as a pressure spike that is sensed by pressure sensing components in the flow circuitry. Such pressure spike or severe pressure oscillations behavior in previous semiconductor manufacturing operations has not been consequential, since this is a transient phenomenon that is quickly replaced by equilibrium flow (and thus the pressure spike is accommodated in the gradual progression of the process system to steady-state operating conditions), but recent trends in rapid beam tuning in ion implant applications have resulted in the processing systems being sensitive to this threshold fluctuation.

The occurrence of extreme pressure oscillations can cause flow circuitry components such as mass flow controllers to temporarily lose control, with the result that the process tool receiving the dispensed fluid receives out-of-specification fluid flow. In some instances, this may result in automatic process monitoring systems functioning to terminate operation, with consequent downtime adverse to the maintenance of manufacturing productivity. In other instances, the manufacturing tool may process the sudden high, or in some cases very low, influx of fluid, with the result that out-of-specification product is produced.

Accordingly, the consequences of influent fluid pressure fluctuations, some of which may be caused by certain components in a pressure regulator apparatus in a fluid supply package, in the fluid flow from pressure-regulated vessels can be severely detrimental to process efficiency and productivity.

SUMMARY

The present disclosure relates to pressure management of pressure-regulated fluid storage and dispensing vessels primarily for, but not necessarily limited to, the dispensation of fluids at low fluid flow rates that are susceptible to pressure-fluctuations upon initiation of a fluid dispensing operation.

In one example embodiment, there is provided a fluid supply package including a pressure-regulated fluid storage and dispensing vessel and a pressure regulator disposed in an interior volume of the dispensing vessel including a housing having a chamber with an inlet and an outlet, the chamber including therein a pressure-sensing assembly with a stationary portion fixed relative to the housing and a movable portion, the stationary and movable portions being interconnected by a bellows structure with diaphragm elements adapted to expand and contract in response to pressure variations in the chamber. The pressure sensing assembly further includes a damper assembly adapted to dampen oscillations at high flow rates and stabilize movement of the pressure-sensing assembly between open and closed positions, the damper assembly disposed within a sleeve formed on the movable portion. The regulator further includes a poppet closure assembly operatively coupled to the pressure-sensing assembly and configured to regulate fluid pressure between the inlet and outlet of the chamber, the poppet closure assembly including a poppet element and a seating structure located at the inlet of the chamber, the poppet element having an upper hemispherical-shaped surface adapted to mate and contact the seating structure to form a seal. The fluid supply package further includes a valve head coupled to the dispensing vessel and adapted for dispensing of a fluid from the vessel through a discharge port, the pressure regulator being disposed upstream of the discharge port and coupled to the valve head, the valve head including a flow control valve that is operable to control fluid dispensing from the vessel.

In another example embodiment, there is provided a pressure regulator including a pressure regulator disposed in an interior volume of the dispensing vessel, the pressure regulator including a housing having a chamber with an inlet and an outlet. The chamber of the regulator includes therein a pressure-sensing assembly with a stationary portion fixed relative to the housing and a movable portion, the stationary and movable portions being interconnected by a bellows structure with diaphragm elements that expand and contract in response to pressure variations in the chamber. The regulator also includes a damper assembly that dampens oscillations and stabilizes movement of the pressure-sensing assembly between open and closed positions, the damper assembly disposed within a sleeve formed on the movable portion. The regulator also includes a poppet closure assembly operatively coupled to the pressure-sensing assembly that regulates fluid pressure between the inlet and outlet of the chamber, the poppet closure assembly including a poppet element and a seating structure located at the inlet of the chamber, the poppet element having an upper hemispherical-shaped surface adapted to mate and contact the seating structure to form a seal.

In yet another example embodiment, there is provided fluid supply package including a pressure-regulated fluid storage and dispensing vessel and a pressure regulator disposed in an interior volume of the dispensing vessel, the pressure regulator including a housing having a chamber with an inlet and an outlet with the chamber including therein a pressure-sensing assembly with a stationary portion fixed relative to the housing and a movable portion, the stationary and movable portions being interconnected by a bellows structure with single weld diaphragm elements adapted to expand and contract in response to pressure variations in the chamber. The regulator further includes a damper assembly that dampens oscillations and stabilizes movement of the pressure-sensing assembly between open and closed positions, the damper assembly being disposed within a sleeve formed on the movable portion. The regulator also including a poppet closure assembly operatively coupled to the pressure-sensing assembly that regulates fluid pressure between the inlet and outlet of the chamber, the poppet closure assembly including a poppet element and a seating structure located at the inlet of the chamber, the poppet element having an upper hemispherical-shaped surface adapted to mate and contact the seating structure to form a seal. The fluid supply package also includes a valve head coupled to the dispensing vessel and adapted for dispensing of a fluid from the vessel through a discharge port, the pressure regulator being disposed upstream of the discharge port and coupled to the valve head, the valve head including a flow control valve that is operable to control fluid dispensing from the vessel.

BRIEF DESCRIPTION OF THE DRAWINGS

The disclosure may be more completely understood in consideration of the following description of various illustrative embodiments in connection with the accompanying drawings FIGS. 1A-1F are cross-sectional elevation, top and enlarged views of a pressure regulator apparatus for a pressure-regulated fluid storage and dispensing vessel according to the teachings of the invention.

FIGS. 2A-2C are cross-sectional elevation, top and enlarged views of an improved bellows structure of a pressure regulator apparatus for a pressure-regulated fluid storage and dispensing vessel according to the teachings of the invention.

Figure 3:
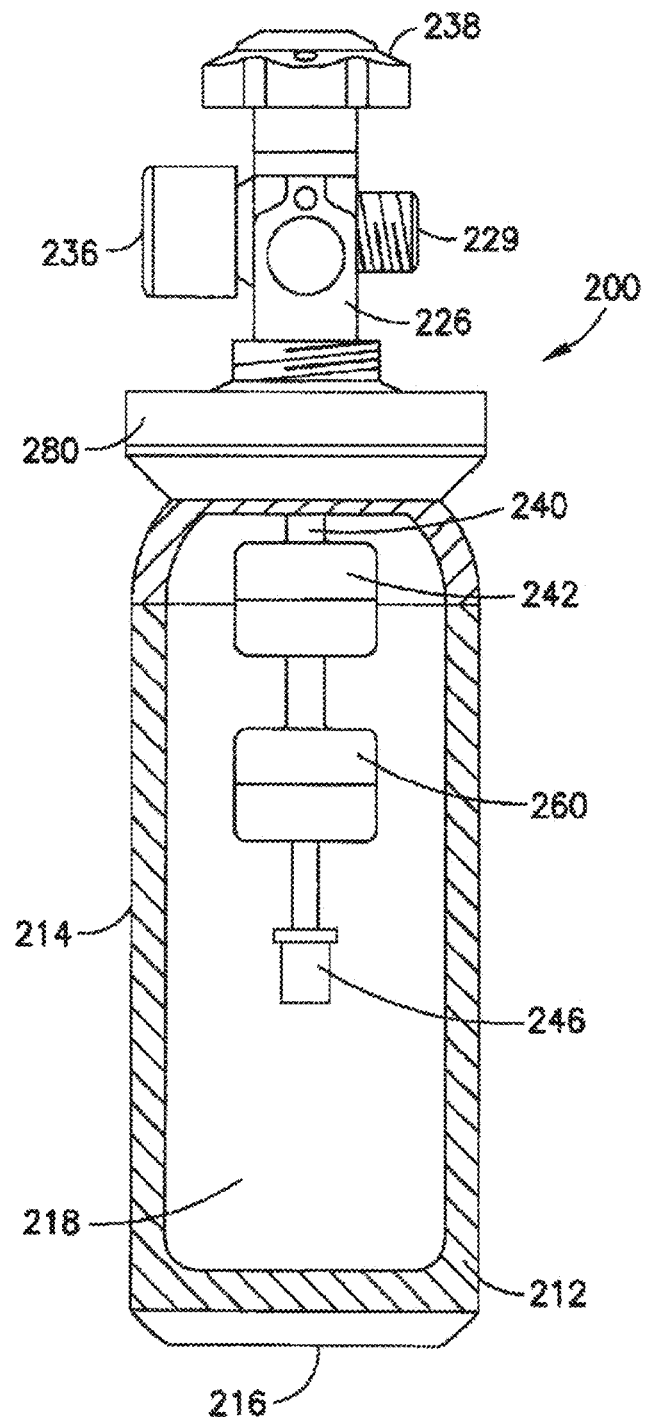
FIG. 3 is a schematic elevation view, in partial cross-section, of a fluid supply package utilizing the pressure regulator devices of FIGS. 1 and 2.

While the disclosure is amenable to various modifications and alternative forms, specifics thereof have been shown by way of example in the drawings and will be described in detail. It should be understood, however, that the intention is not to limit aspects of the disclosure to the particular illustrative embodiments described. On the contrary, the intention is to cover all modifications, equivalents, and alternatives falling within the spirit and scope of the disclosure.

DETAILED DESCRIPTION

The following detailed description should be read with reference to the drawings in which similar elements in different drawings are numbered the same. The detailed description and the drawings, which are not necessarily to scale, depict illustrative embodiments and are not intended to limit the scope of the invention. The illustrative embodiments depicted are intended only as exemplary. Selected features of any illustrative embodiment may be incorporated into an additional embodiment unless clearly stated to the contrary.

The various embodiments of the present disclosure relate to pressure management of pressure-regulated fluid storage and dispensing vessels that can be susceptible to substantial fluctuations in pressure behavior, high or low, upon initiation of a fluid dispensing operation, and to pressure management arrangements, apparatus and methods for combating continual periodic pressure oscillation behavior, such as fluid pressure excursions of a recurrent episodic character. The present disclosure contemplates various approaches to modifying the pressure regulator device housed in the fluid vessel so that dispensing operation can be initiated more smoothly and without substantial pressure/flow rate fluctuation consequences. In such approaches, the pressure regulators are operated so that outlet pressure and flow from such devices are modulated to dampen and at least partially attenuate any sudden pressure fluctuation at startup.

As used herein, the term "pressure-regulated" in reference to fluid storage and dispensing vessels means that such vessels have at least one pressure regulator device, set pressure valve, or vacuum/pressure activated check valve disposed in an interior volume of the vessel and/or in a valve head of the vessel, with each such pressure regulator device being adapted so that it is responsive to fluid pressure in the fluid flow path immediately downstream of the pressure regulator device, and opens to enable fluid flow at a specific downstream reduced pressure condition in relation to a higher fluid pressure upstream of the pressure regulator device, and subsequent to such opening operates to maintain the pressure of fluid discharged from the pressure regulator device at a specific, or "set point," pressure level.

These various approaches to reduce dramatic pressure oscillations in corresponding specific embodiments include the following operational techniques and arrangements: optimizing design of the pressure regulator to minimize internal friction necessary to open the poppet element of the pressure regulator in the vessel; improvements to the poppet and pressure regulator sealing surface to prevent sticking of the poppet when it is first opened, in which the poppet still provides positive closure and stoppage of fluid flow in the closed position, but wherein frictional force required to be overcome in displacing the poppet from its seating structure is minimized, in which such improvements include one or more of: (i) selection of alternative materials of construction, having a low level of deformation in use, (ii) modification of the shape of the poppet from a conventional conical sealing shape to a spherical sealing shape, (iii) use of a non-metallic material of construction for the poppet seating structure, and (iv) use of a metal poppet element and a fluid compatible plastic material of construction for the poppet seating structure, altering geometry of a matably engageable poppet element and seat structure of the pressure regulator, so that minimal contact is made at an obtuse angle between such elements, in order to minimize potential sticking behavior, e.g., wherein the poppet element has a round, blunt sealing surface reposing on a flat cylindrical (donut-shaped or washer-shaped) seating structure; modification of poppet element and seating structure materials of construction to minimize sticking behavior or "stiction" upon closing and opening of the pressure regulator, e.g., use of a hard, stiff, fluid compatible polymer material for the seating structure and metal for the face of the poppet element.

Another portion of the pressure regulator is modified to improve fluid dispensation by providing: modifications of the bellows and pressure-sensing assembly of the pressure regulator device, to include one or more of: 1) modification of the bellows structure, such as by variation of the number of diaphragm elements, material of construction, thickness, and elasticity of the bellows, so that the travel distance of the poppet element is reduced and these combination of elements facilitates in at least partially attenuating pressure fluctuations of fluid dispensed from the vessel at inception of fluid dispensing. 2) modification of geometry of the regulator, including the chamber formed by a stationary portion, a movable portion and the bellows structure.

In the aforementioned fluid supply package, the pressure-regulated vessel may comprise a series arrangement of pressure regulators in the interior volume of the vessel, e.g., two or more regulators in series. The set point of the pressure regulators may have any suitable value, and in various embodiments the pressure regulator immediately upstream of the discharge port may have a subatmospheric pressure set point.

Referring now to the drawings, more particularly referring to FIGS. 1A-1E there is illustrated cross-sectional elevation, top and enlarged views of a pressure regulator apparatus or assembly 100 for a pressure-regulated fluid storage and dispensing vessel according to the teachings of the invention. Pressure regulator 100 includes a housing 110 which is formed from cooperating portions 112 and 114 and the housing portions are secured together in a hermetically sealed manner. For example, the housing portions may be welded together along mating edges and as represented by numeral 116. In the illustrated embodiment, housing 110 includes an inlet 120 that communicates with an upstream fluid line (not shown) to supply pressurized fluid to housing 110. Any conventional arrangement for interconnecting the inlet 120 or housing 110 with the fluid line may be used, although the intended environment for the subject regulator is one that is exposed to low or high pressure, such as for the semiconductor industry where ultra clean environments are required. Likewise, an outlet 122 is formed in the housing second portion 114 and communicates with a downstream fluid line (not shown).

Housing 110 forms a chamber 124 having at least partially secured therein a pressure-sensing assembly 130 that includes a stationary portion 132 fixed to the housing and a movable portion 134 operatively associated with the stationary portion. In one example embodiment, circumferentially spaced legs 136 extend radially outward from the periphery of the stationary portion and are received within a groove 140 in housing 110 so that when the housing portions are welded together along their mating edges, the stationary portion is also simultaneously secured in fixed relation by the weld.

Referring to FIG. 1A and to FIG. 1E, the stationary 132 and movable portions 134 of pressure-sensing assembly 130 are joined together by a flexible member, such as bellows 142. One form of bellows 142 includes a series of annular members or diaphragms that are alternately secured at radially inner and outer regions (in double weld fashion) to define an accordion-like arrangement. Opposite ends of bellows assembly 142 are then secured to stationary 132 and movable portions 134 of pressure-sensing assembly 130, respectively. Such a bellows arrangement has a relatively small stack height in a fully collapsed condition (FIG. 1E). In its fully collapsed condition, a poppet closure assembly 160, operatively coupled to movable portion 134 and adjacent to inlet 120, is closed.

Referring now to FIGS. 1A, 1C and 1F, a poppet closure assembly 160 is secured to movable portion 134 of pressure-sensing assembly 130 to open or close inlet 120. More particularly, poppet closure assembly 160 includes a stem 162 having an enlarged base 164 coupled to movable portion 134 on one end and coupled to a poppet 167 on the other end of stem 162. Poppet 167 engages a poppet seat structure 170. The base 164 is mounted adjacent the pressure-sensing assembly 130 while the stem 162 extends axially toward the inlet 120. Stem 162 proceeds outwardly of chamber 124 and into the inlet 120 of the regulator. A second or outer end 166 of the stem is threaded and receives an elastomeric member 168 that defines poppet 167. Preferably, poppet 167 is self-tapping so that during assembly, it may be threaded onto the stem, and through a predetermined selected number of turns backed off of seat structure 170 to define a precise opening. In a related embodiment, an O-ring 172 is interposed between an upper end of poppet 167 and seat structure 170 to assist in avoiding stiction problems during operation.

In this example embodiment, poppet 167 mounted on poppet stem 162 has been modified to provide a semi-hemispherical shape at its proximal end near stem 162 for matably sealingly engaging seat structure 170. In this embodiment, seat structure 170 may be formed of any suitable material, and may for example comprise a hard, stiff, fluid compatible polymer, such as a polyacetal material or a fluoropolymer such as, for example, polychlorotetrafluoroethylene. Likewise, poppet 167 may be formed of any suitable material compatible with the seat structure, and may for example be formed of a metal, such as stainless steel, titanium, nickel, or other metal or material of construction that is compatible with the other components of poppet assembly 160 of regulator 100, as well as the fluids to be flowed through such regulator in use.

Referring briefly to FIGS. 1A and 1D, stationary portion 132 and movable portion 134 coupled to bellows assembly 142 cooperate with one another to control axial movement of movable portion 134 toward and away from inlet 120 in response to varying pressure in chamber 124. A dampening assembly 150 is included in pressure-sensing assembly 130 for dampening pressure fluctuations due to sudden increases in fluid pressure as the fluid within a fluid vessel is dispensed. Dampening assembly 150 is particularly suited for high flow conditions. Dampening assembly 150, as shown in FIG. 1D, is comprised of an axial member 144, extends from stationary portion 132 toward inlet 120 and is fixedly secured to stationary portion 132, a spring member 146 and an upper circumferential sleeve 148. Axial member 144 includes a body member 145 having a proximal end coupled to stationary portion 132 and a distal end protruding towards movable portion 134. In this example embodiment, axial member body 145 has spring member 146 disposed circumferentially about the distal end of the axial member 144 with circumferential sleeve 148 located about the proximal end of axial member 144 and in contact with an upper end of spring member 146. Surrounding axial member 144 is a sleeve portion 135 extending from a central region of movable portion 134 toward outlet 122. In this example embodiment, circumferential sleeve 148 is solid in construction and has an inner surface directly contacting an outer surface of axial body 145, but it is not necessarily limited to a solid construction.

As described above, undesirable oscillations of the pressure-sensing assembly 130 are often associated with high flow rates or unpredictable low flow rates. To overcome problems associated with the pressure oscillations, dampening assembly 150 is provided. In prior art arrangements, dampening assembly 150 would include an elastomeric or resilient member, such as an O-ring, interposed between the axial member 144 and sleeve portion 135. However, it has been discovered that in low flow rate and low pressure applications, the O-ring actually hinders opening and closing of poppet closure assembly 160 and movement of poppet 167. Therefore, it is preferable to eliminate the elastomeric O-ring normally located within a circumferential sleeve 148 at the top of spring member 146. In another embodiment, a solid circumferential ring 148 is used to facilitate movement of axial member 144 without having the stiction challenges.

In operation, an interior cavity 131 of pressure-sensing assembly 130 has a predetermined pressure charge. The movable portion 134 moves axially in response to the pressure differential between cavity 131 and the fluid pressure in chamber 124. The flexible bellows 142 allows this relative movement and, as will be understood, poppet member or element 167 varies its relationship with seat structure 170 to regulate fluid flow between inlet 120 and outlet 121. The expansion and contraction of the member 130 in response to the pressure in chamber 124 is thus dampened by the slight frictional drag imposed by circumferential ring 148. This permits the regulator to compensate for oscillations associated with an occasional spike or increase in a fluid flow rates. Accordingly, at very low flow rates associated with positions of the poppet 167 adjacent the shut-off or closed position, movable portion 134 of the pressure-sensing assembly can move more freely.

Referring now to FIGS. 2A-2C, there is illustrated cross-sectional elevation, top and enlarged views of an improved bellows structure 242 of a pressure regulator apparatus 200 for a pressure-regulated fluid storage and dispensing vessel according to the teachings of the invention. In this example embodiment, regulator 200 includes a housing 210 that includes a pressure sensing assembly 230 comprised of a stationary portion 232, a movable portion 234 interconnected by a bellows structure 242 having various diaphragm elements. Prior art bellows with diaphragm elements have utilized double weld construction, which have led to expansion and contraction problems due to a loss of flexibility (shown more closely in FIG. 1E). In this example embodiment, the diaphragm elements of bellows 242 are formed of single weld construction thereby allowing more flexibility in the expansion and contraction of bellows 242, as seen more clearly in FIG. 2C. Bellows 242 in this example embodiment is illustrated in the closed or collapsed position.

Referring now to FIG. 3, there is illustrate an elevation view, in partial cross-section, of a standard fluid supply package 200 which includes a fluid storage and dispensing vessel 212 comprising a cylindrical sidewall 214 and a floor 216 enclosing an interior volume 218 of the vessel. The side wall and floor may be formed of any suitable material of construction, e.g., metal, gas-impermeable plastic, fiber-resin composite material, etc., as appropriate for the gas to be contained in the vessel, the end use environment of the apparatus, and the pressure levels to be maintained in the vessel in storage and dispensing use. In this example embodiment, a collar flange member 280 is coupled to the neck of the vessel 212 and a valve head body 226 is secured to the collar flange member 280. This type of fluid storage and dispensing system is described in U.S. Pat. Nos. 5,937,895, 6,007,609, 6,045,115, and 7,905,247, albeit with the first three of such patents referencing a single port valve cylinder head, however the disclosure of all of such patents are incorporated herein by reference in their respective entireties.

The valve head body 226 is formed with a central vertical passage therein for dispensing of gas deriving from fluid in the vessel 212. The valve head body contains a flow control valve that is coupled with the valve actuator 238 (hand wheel or pneumatic actuator), for selective manual or automated opening or closing of the valve. The valve actuator thus can be any of various suitable types, e.g., manual actuators, pneumatic actuators, electromechanical actuators, etc., or any other suitable devices for opening and closing the valve in the valve head. A valve element, such as a flow control valve, is disposed downstream of one or more regulators, so that fluid dispensed from the vessel flows through the regulator prior to flow through the flow control valve. The valve head body 226 typically includes a fill passage formed therein to communicate at its upper end with a fill port. The fill passage at its lower end exits the valve head body 226 at a bottom surface thereof as shown. When the fill port is coupled with a source of the gas to be contained in the vessel, the fluid can flow through the fill passage and into the interior volume 218 of the vessel 212.

Joined to the lower end of valve head body 226 is an extension tube 240, containing an upper particle filter 239 therein. Upper regulator 242 is mounted on the end of the extension tube 240. The upper regulator 242 is secured to the extension tube lower end in any suitable manner, as for example by providing internal threading in the lower end portion of the extension tube, with which the regulator 242 is threadably engageable. Alternatively, the upper regulator may be joined to the lower end of the extension tube by compression fittings or other leak-tight vacuum and pressure fittings, or by being bonded thereto, e.g., by welding, brazing, soldering, melt-bonding, or by suitable mechanical joining means and/or methods, etc. Regulators 100 and 200 described in FIGS. 1 and 2 are used in this fluid supply vessel configuration to assist in dispensing of fluid to the external processing systems.

The upper regulator 242 is arranged in series relationship with a lower regulator 260, as shown. For such purpose, the upper and lower regulators may be threadably engageable with one another, by complementary threading comprising threading on the lower extension portion of the upper regulator 242, and threading that is matably engageable therewith on the upper extension portion of the lower regulator 260. Alternatively, the upper and lower regulators may be joined to one another in any suitable manner, as for example by coupling or fitting means, by adhesive bonding, welding, brazing, soldering, etc., or the upper and lower regulators may be integrally constructed as components of a dual regulator assembly. At its lower end, the lower regulator 260 is joined to high efficiency particle filter 246. The high efficiency particle filter 246 serves to prevent contamination of the regulator elements and the flow control valve with particulates or other contaminating species that otherwise may be present in the fluid flowed through the regulators and valves in the operation of the apparatus.

The fluid dispensed in such manner will be at a pressure determined by the set point of the regulator 242. The respective set points of the regulator 260 and the regulator 242 in the FIG. 3 embodiment may be selected or preset at any suitable values to accommodate a specific desired end use application. For example, the lower (upstream) regulator 260 may have a set point that is in a range of from about 20 psig to about 2500 psig. The upper (downstream) regulator 242 may have a set point that is above or below, preferably below, the pressure set point of the lower (upstream) regulator 260, e.g., in a range of from about 1 torr up to 2500 psig. In one illustrative embodiment, the lower (upstream) regulator 260 has a set point pressure value that is in the range of from about 100 psig to about 1500 psig, while the upper (downstream) regulator 242 has a set point pressure value in the range of from about 100 torr to about 50 psig, wherein the lower (upstream) pressure set point is above the set point of the upper (downstream) regulator.

Figure 5:
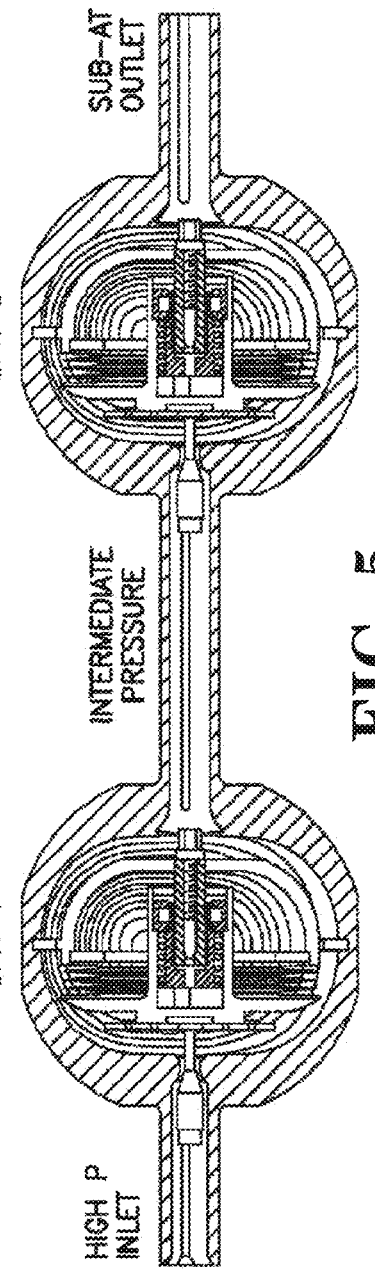
FIG. 5 is a schematic representation of a series-arranged dual regulator assembly, of a type as shown and described with reference to the fluid supply package of FIG. 3.

Although the set points of the regulators in a serial regulator assembly may be established in any suitable ratio in relation to one another, in a two-regulator assembly such as shown in FIGS. 3 and 5, the upstream regulator in preferred practice advantageously has a pressure set point that is at least twice the set point value (measured in the same pressure units of measurement) of the downstream regulator.

In one illustrative embodiment of a fluid storage and dispensing system of the type shown in FIG. 3, the vessel 212 can be a 3AA 2015 DOT 2.2 liter cylinder. The vessel can include a high efficiency particle filter 246. In some embodiments, the regulators are HF series Swagelok® pressure regulators, with the upper (downstream) regulator 242 having a set point pressure in the range of from 100 torr to 100 psig, and the lower (upstream) regulator 260 having a set point pressure in the range of from 100 psig to 1500 psig, and with the set point pressure of the lower (upstream) regulator 260 being at least twice the set point pressure of the upper (downstream) regulator 242. In a specific embodiment, the upper (downstream) regulator 242 may have an inlet pressure of 100 psig and outlet pressure of 500 torr, and the lower (upstream) regulator 260 may have an inlet pressure of 1500 psig and outlet pressure of 100 psig.

A fluid supply package 200 with the regulator improvements illustrated in FIGS. 1 and 2 can be utilized for sub-atmospheric pressure dopant gas delivery for ion implantation. Regardless of cylinder temperature, elevation or fill volume, the system delivers product only when a vacuum level below 500 torr, is applied to the use port. Product cannot flow from the fluid supply package without such vacuum. Fluid stored in and dispensed from the fluid supply package of the disclosure may be of any suitable type, and may for example comprise a fluid having utility in semiconductor manufacturing, manufacture of flat-panel displays, or manufacture of solar panels.

The fluid contained in the fluid storage and dispensing vessel may for example comprise a hydride fluid for semiconductor manufacturing operations. Examples of hydride fluids of such type include arsine, phosphine, stibine, silane, chlorosilane, diborane, germane, disilane, trisilane, methane, hydrogen selenide, hydrogen sulfide, and hydrogen. Other fluids useful in semiconductor manufacturing operations may be employed, including acid fluids such as hydrogen fluoride, boron trichloride (BCl3), boron trifluoride (BF3), diboron tetrafluoride (B2F4), hydrogen chloride (HCl), halogenated silanes such as, for example silicon tetrafluoride, halogenated disilanes, germanium tetrafluoride, phosphorous trifluoride, phosphorous pentafluoride, arsenic trifluoride, arsenic pentafluoride, nitrogen, oxygen, fluoride, xenon, argon, krypon, carbon monoxide, carbon dioxide, carbon tetrafluoride, trifluoromethane, difluoromethane, fluoromethane, nitrogen trifluoride, carbonyl fluoride, as well as mixtures of two or more of the foregoing, etc., having utility in semiconductor manufacturing operations as halide etchants, cleaning agents, source reagents, dopant gases, etc. Other reagents which may be thus stored and delivered include gaseous organometallic reagents used as precursors for metalorganic chemical vapor deposition (MOCVD) and atomic layer deposition (ALD).

Figure 4:
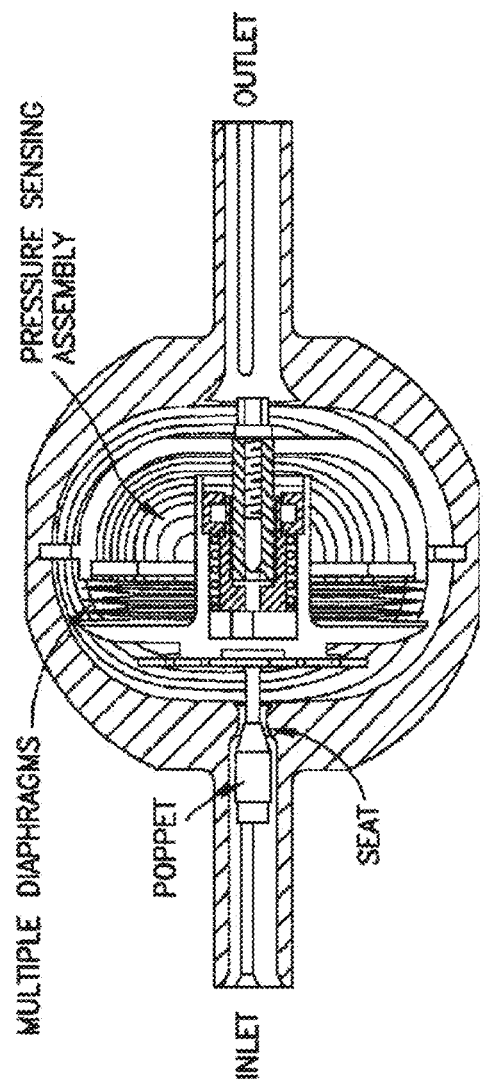
FIG. 4 is a cross-sectional view of a pressure regulator of the general type utilized in the vessels shown and described with respect to the FIG. 3.

FIG. 4 is a cross-sectional view of a pressure regulator of the general type utilized in the vessels shown and described with respect to the FIG. 3 and can be substituted with the embodiments described in FIGS. 1 and 2. Prior art pressure regulator currently in use are described in U.S. Pat. No. 5,303,734, the disclosure of which is hereby incorporated herein by reference in its entirety. As illustrated, the pressure regulator includes a main central housing communicating with inlet and outlet passages. A poppet is reposed in the inlet passage, and is shown in closed position, as engaged with the seat of the inlet passage, to close such passage to fluid flow. The poppet is coupled with a stem that in turn is connected to the pressure sensing assembly in the interior volume of the pressure regulator. The pressure sensing assembly includes multiple diaphragms defining a bellows structure, in which the pressure sensing assembly is responsive to pressure level in the outlet passage of the regulator, such that pressure in the outlet passage that is below a predetermined setpoint pressure will cause movement of the multiple diaphragms and corresponding translation of the pressure sensing assembly and the poppet stem coupled thereto with, so that the poppet is disengaged from its seat, to allow fluid flow through the inlet passage and central chamber of the regulator to the outlet passage, for flow of fluid from the discharge opening of the outlet passage. When fluid pressure in the outlet passage is above the set point pressure of the regulator, the pressure sensing assembly will responsively translate the poppet stem and associated poppet, so that the poppet engages the seat of the inlet passage, to close the passage to fluid flow therethrough.

FIG. 5 illustrates a series-arranged dual regulator assembly, of a type as shown and described with reference to the fluid supply package of FIG. 3 and can be substituted with the embodiments described in FIGS. 1 and 2 to improve performance, especially in low flow rate applications. In this series-arranged regulator assembly, a first pressure regulator SPR-1 is in series with a second pressure regulator SPR-2. The respective regulators are coupled with one another by an intermediate pressure connection passage. Regulator SPR-1 has a higher pressure set point in relation to the pressure set point of regulator SPR-2. Regulator SPR-1 is disposed with its high pressure inlet (High P Inlet) exposed to high pressure fluid when the regulator assembly is installed in a fluid storage and dispensing vessel as shown in FIGS. 1 and 3. Regulator SPR-2 is disposed in series with regulator SPR-1, and may for example have a set point pressure that is a subatmospheric pressure, so that the downstream regulator (SPR-2) will not dispense fluid unless its outlet is below the subatmospheric set point pressure of such regulator SPR-2.

Accordingly, when regulator SPR-2 opens in response to outlet pressure below the set point subatmospheric pressure, there is a corresponding reduction in pressure in the intermediate pressure connection passage between the two regulators, and when such intermediate pressure has been reduced below the set point pressure of regulator SPR-1, then regulator SPR-1 will open, and fluid will flow from the high-pressure inlet of regulator SPR-1 through such regulator, through the intermediate pressure connection passage and through the regulator SPR-2 to the subatmospheric pressure outlet. By such arrangement, a high-pressure fluid is contained in a safe and effective manner in the fluid storage and dispensing vessel, and pressure of such fluid in dispensing is reduced by the upstream pressure regulator to an intermediate pressure, and by the downstream pressure regulator from such intermediate pressure to the lower discharge pressure determined by the set point of the downstream pressure regulator.

Aspects

Aspect 1. A fluid supply package comprising a pressure-regulated fluid storage and dispensing vessel; a pressure regulator disposed in an interior volume of the dispensing vessel including a housing having a chamber with an inlet and an outlet, the chamber including therein a pressure-sensing assembly with a stationary portion fixed relative to the housing and a movable portion, the stationary and movable portions being interconnected by a bellows structure with diaphragm elements adapted to expand and contract in response to pressure variations in the chamber; a damper assembly adapted to dampen oscillations and stabilize movement of the pressure-sensing assembly between open and closed positions, the damper assembly disposed within a sleeve formed on the movable portion; a poppet closure assembly operatively coupled to the pressure-sensing assembly and adapted to regulate fluid pressure between the inlet and outlet of the chamber, the poppet closure assembly including a poppet element and a seating structure located at the inlet of the chamber, the poppet element having an upper hemispherical-shaped surface adapted to mate and contact the seating structure to form a seal; and a valve head coupled to the dispensing vessel and adapted for dispensing of a fluid from the vessel through a discharge port, the pressure regulator being disposed upstream of the discharge port and coupled to the valve head, the valve head including a flow control valve that is operable to control fluid dispensing from the vessel.

Aspect 2. The fluid supply package of aspect 1, wherein the poppet closure assembly further includes an O-ring member interposed between the upper poppet element surface and the seating structure.

Aspect 3. The fluid supply package of aspect 1, wherein the diaphragm of the bellows structure is configured to have single weld diaphragm elements.

Aspect 4. The fluid supply package of aspects 1-3, wherein the poppet closure assembly is further comprised of a material of construction having a low level of deformation while under pressure.

Aspect 5. The fluid supply package of aspects 1-4, wherein the poppet closure assembly is further comprised of a poppet element of a non-conical sealing shape with a complimentary-shaped seating structure.

Aspect 6. The fluid supply package of aspects 1-5, wherein the poppet seating structure of the poppet closure assembly is comprised of a non-metallic material.

Aspect 7. The fluid supply package of aspects 1-3, wherein the bellows structure with diaphragm elements is comprised of a material having a thickness and an elasticity configured to reduce a travel distance of the poppet element within the poppet closure assembly thereby partially attenuating a fluid dispensed from the vessel at inception of fluid dispensing.

Aspect 8. The fluid supply package of aspect 1, wherein the damper assembly includes an axial member with a body, a circumferential sleeve and a spring member, the axial body member having a proximal end coupled to the stationary portion and a distal end protruding towards the movable portion, the axial member body having the spring member disposed circumferentially about the distal end of the axial member with the circumferential sleeve located about the proximal end of the axial member and in contact with an upper end of the spring member.

Aspect 9. The fluid supply package of aspect 1, wherein the circumferential sleeve is solid in construction and has an inner surface directly contacting an outer surface of the axial body.

Aspect 10. The fluid supply package of aspect 7, wherein said fluid comprises a fluid for semiconductor manufacturing, manufacturing of flat-panel displays, or manufacture of solar panels.

Aspect 11. A pressure regulator assembly comprising: a pressure regulator disposed in an interior volume of the dispensing vessel including a housing having a chamber with an inlet and an outlet, the chamber including therein a pressure-sensing assembly with a stationary portion fixed relative to the housing and a movable portion, the stationary and movable portions being interconnected by a bellows structure with diaphragm elements adapted to expand and contract in response to pressure variations in the chamber; a damper assembly adapted to dampen oscillations and stabilize movement of the pressure-sensing assembly between open and closed positions, the damper assembly disposed within a sleeve formed on the movable portion; and a poppet closure assembly operatively coupled to the pressure-sensing assembly and adapted to regulate fluid pressure between the inlet and outlet of the chamber, the poppet closure assembly including a poppet element and a seating structure located at the inlet of the chamber, the poppet element having an upper hemispherical-shaped surface adapted to mate and contact the seating structure to form a seal.

Aspect 12. The pressure regulator assembly of aspect 11, wherein the poppet closure assembly further includes an O-ring member interposed between the upper poppet element surface and the seating structure.

Aspect 13. The pressure regulator assembly of aspect 11, wherein the diaphragm of the bellows structure is configured to have single weld diaphragm elements.

Aspect 14. The pressure regulator of aspects 11-13, wherein the poppet closure assembly is further comprised of a material of construction having a low level of deformation while under pressure.

Aspect 15. The pressure regulator assembly of aspects 11-14, wherein the poppet closure assembly is further comprised of a poppet element of a non-conical sealing shape with a complimentary-shaped seating structure.

Aspect 16. The pressure regulator assembly of aspects 11-15, wherein the poppet seating structure of the poppet closure assembly is comprised of a non-metallic material.

Aspect 17. The pressure regulator assembly of aspects 11-13, wherein the bellows structure with diaphragm elements is comprised of a material having a thickness and an elasticity configured to reduce a travel distance of the poppet element within the poppet closure assembly thereby partially attenuating a fluid dispensed from the vessel at inception of fluid dispensing.

Aspect 18. The pressure regulator assembly of aspects 11-13, wherein the damper assembly includes an axial member with a body, a circumferential sleeve and a spring member, the axial body member having a proximal end coupled to the stationary portion and a distal end protruding towards the movable portion, the axial member body having the spring member disposed circumferentially about the distal end of the axial member with the circumferential sleeve located about the proximal end of the axial member and in contact with an upper end of the spring member.

Aspect 19. A fluid supply package comprising: a pressure-regulated fluid storage and dispensing vessel; a pressure regulator disposed in an interior volume of the dispensing vessel including a housing having a chamber with an inlet and an outlet, the chamber including therein a pressure-sensing assembly with a stationary portion fixed relative to the housing and a movable portion, the stationary and movable portions being interconnected by a bellows structure with single weld diaphragm elements adapted to expand and contract in response to pressure variations in the chamber; a damper assembly adapted to dampen oscillations and stabilize movement of the pressure-sensing assembly between open and closed positions, the damper assembly disposed within a sleeve formed on the movable portion; a poppet closure assembly operatively coupled to the pressure-sensing assembly and adapted to regulate fluid pressure between the inlet and outlet of the chamber, the poppet closure assembly including a poppet element and a seating structure located at the inlet of the chamber, the poppet element having an upper hemispherical-shaped surface adapted to mate and contact the seating structure to form a seal; and a valve head coupled to the dispensing vessel and adapted for dispensing of a fluid from the vessel through a discharge port, the pressure regulator being disposed upstream of the discharge port and coupled to the valve head, the valve head including a flow control valve that is operable to control fluid dispensing from the vessel.

Aspect 20. The fluid supply package of aspect 19, wherein the damper assembly includes an axial member with a body, a circumferential sleeve and a spring member, the axial body member having a proximal end coupled to the stationary portion and a distal end protruding towards the movable portion, the axial member body having the spring member disposed circumferentially about the distal end of the axial member with the circumferential sleeve located about the proximal end of the axial member and in contact with an upper end of the spring member.

Having thus described several illustrative embodiments of the present disclosure, those of skill in the art will readily appreciate that yet other embodiments may be made and used within the scope of the claims hereto attached. Numerous advantages of the disclosure covered by this document have been set forth in the foregoing description. It will be understood, however, that this disclosure is, in many respect, only illustrative. Changes may be made in details, particularly in matters of shape, size, and arrangement of parts without exceeding the scope of the disclosure. The disclosure's scope is, of course, defined in the language in which the appended claims are expressed.

What is claimed is:

1. A fluid supply package comprising:
a pressure-regulated fluid storage and dispensing vessel;
a pressure regulator disposed in an interior volume of the dispensing vessel and including a housing having a chamber with an inlet and an outlet, the chamber including a pressure-sensing assembly with a stationary portion fixed relative to the housing and a movable portion, the stationary portion and the movable portion being interconnected by a bellows structure, wherein the bellows structure includes a flexible member that includes diaphragm elements adapted to expand and contract in response to pressure variations in the chamber, wherein the diaphragm elements comprise a series of annular members alternately secured by a single weld at radially inner and outer regions, wherein opposite ends of the bellows structure are secured to the stationary portion and the movable portion in order to fully collapse when a poppet closure is operatively coupled to the movable portion and the inlet is closed;
a damper assembly adapted to dampen oscillations and stabilize movement of the pressure-sensing assembly between an open position and a closed position, the damper assembly disposed within a sleeve formed on the movable portion;
a poppet closure assembly operatively coupled to the pressure-sensing assembly and adapted to regulate fluid pressure between the inlet and the outlet of the chamber, the poppet closure assembly including a poppet element and a seating structure located at the inlet of the chamber, the poppet element having an upper hemispherical-shaped surface adapted to mate and contact the seating structure to form a seal, wherein the poppet closure assembly further includes an O-ring member interposed between an upper poppet element surface and the seating structure; and
a valve head coupled to the dispensing vessel and adapted for dispensing of a fluid from the dispensing vessel through a discharge port, the pressure regulator being disposed upstream of the discharge port and coupled to the valve head, the valve head including a flow control valve that is operable to control the fluid dispensing from the dispensing vessel.

2. The fluid supply package of claim 1, wherein the poppet closure assembly is further comprised of a material of construction having a low level of deformation while under pressure.

3. The fluid supply package of claim 1, wherein the seating structure of the poppet closure assembly is comprised of a non-metallic material.

4. The fluid supply package of claim 1, wherein the bellows structure comprises a material having a thickness and an elasticity configured to reduce a travel distance of the poppet element within the poppet closure assembly thereby partially attenuating the fluid dispensed from the dispensing vessel.

5. The fluid supply package of claim 1, wherein the damper assembly includes an axial member, a circumferential sleeve and a spring member, the axial member having a proximal end coupled to the stationary portion and a distal end protruding towards the movable portion, the axial member having the spring member disposed circumferentially about the distal end of the axial member with the circumferential sleeve located about the proximal end of the axial member and in contact with an upper end of the spring member.

6. The fluid supply package of claim 5, wherein the circumferential sleeve is solid in construction and has an inner surface directly contacting an outer surface of the axial member.

7. The fluid supply package of claim 4, wherein said fluid comprises a fluid for semiconductor manufacturing, manufacturing of flat-panel displays, or manufacture of solar panels.

8. A pressure regulator assembly comprising:
a pressure regulator disposed in an interior volume of a dispensing vessel and including a housing having a chamber with an inlet and an outlet, the chamber including a pressure-sensing assembly with a stationary portion fixed relative to the housing and a movable portion, the stationary portion and the movable portion being interconnected by a bellows structure, wherein the bellows structure includes a flexible member that includes diaphragm elements adapted to expand and contract in response to pressure variations in the chamber, wherein the diaphragm elements comprise a series of annular members alternately secured by a single weld at radially inner and outer regions, wherein opposite ends of the bellows structure are secured to the stationary portion and the movable portion in order to fully collapse when a poppet closure is operatively coupled to the movable portion and the inlet is closed;

a damper assembly adapted to dampen oscillations and stabilize movement of the pressure-sensing assembly between open and closed positions, the damper assembly disposed within a sleeve formed on the movable portion; and a poppet closure assembly operatively coupled to the pressure-sensing assembly and adapted to regulate fluid pressure between the inlet and the outlet of the chamber, the poppet closure assembly including a poppet element and a seating structure located at the inlet of the chamber, the poppet element having an upper hemispherical-shaped surface adapted to mate and contact the seating structure to form a seal, wherein the poppet closure assembly further includes an O-ring member interposed between an upper poppet element surface and the seating structure.

9. The pressure regulator assembly of claim 8, wherein the poppet closure assembly is further comprised of a material of construction having a low level of deformation while under pressure.

10. The pressure regulator assembly of claim 8, wherein the seating structure of the poppet closure assembly is comprised of a non-metallic material.

11. The pressure regulator assembly of claim 8, wherein the bellows structure comprises a material having a thickness and an elasticity configured to reduce a travel distance of the poppet element within the poppet closure assembly thereby partially attenuating a fluid dispensed from the dispensing vessel.

12. The pressure regulator assembly of claim 8, wherein the damper assembly includes an axial member, a circumferential sleeve, and a spring member, the axial member having a proximal end coupled to the stationary portion and a distal end protruding towards the movable portion, the axial member having the spring member disposed circumferentially about the distal end of the axial member with the circumferential sleeve located about the proximal end of the axial member and in contact with an upper end of the spring member.

13. A fluid supply package comprising:
a pressure-regulated fluid storage and dispensing vessel;

a pressure regulator disposed in an interior volume of the dispensing vessel and including a housing having a chamber with an inlet and an outlet, the chamber including a pressure-sensing assembly with a stationary portion fixed relative to the housing and a movable portion, the stationary portion and the movable portion being interconnected by a bellows structure, wherein the bellows structure includes a flexible member that includes diaphragm elements adapted to expand and contract in response to pressure variations in the chamber, wherein the diaphragm elements comprise a series of annular members alternately secured by a single weld at radially inner and outer regions, wherein opposite ends of the bellows structure is secured to the stationary portion and the movable portion in order to fully collapse when a poppet closure is operatively coupled to the movable portion and the inlet is closed;

a damper assembly adapted to dampen oscillations and stabilize movement of the pressure-sensing assembly between open and closed positions, the damper assembly disposed within a sleeve formed on the movable portion;

a poppet closure assembly operatively coupled to the pressure-sensing assembly and adapted to regulate fluid pressure between the inlet and the outlet of the chamber, the poppet closure assembly including a poppet element and a seating structure located at the inlet of the chamber, the poppet element having an upper hemispherical-shaped surface adapted to mate and contact the seating structure to form a seal, wherein the poppet closure assembly further includes an O-ring member interposed between an upper poppet element surface and the seating structure; and a valve head coupled to the dispensing vessel and adapted for dispensing of a fluid from the dispensing vessel through a discharge port, the pressure regulator being disposed upstream of the discharge port and coupled to the valve head, the valve head including a flow control valve that is operable to control a fluid dispensing from the dispensing vessel.

14. The fluid supply package of claim 13, wherein the damper assembly includes an axial member, a circumferential sleeve and a spring member, the axial member having a proximal end coupled to the stationary portion and a distal end protruding towards the movable portion, the axial member having the spring member disposed circumferentially about the distal end of the axial member with the circumferential sleeve located about the proximal end of the axial member and in contact with an upper end of the spring member.

* * * * *